United States Patent [19]

Pritz et al.

[11] 4,408,100
[45] Oct. 4, 1983

[54] POSITION LOAD DISTRIBUTION AND MANAGEMENT SYSTEM FOR KEY TELEPHONE SYSTEMS

[75] Inventors: George E. Pritz, Locust Grove; Robert Novakowski, Fairfax, both of Va.

[73] Assignee: Data Plus, Inc., Lorton, Va.

[21] Appl. No.: 239,347

[22] Filed: Mar. 2, 1981

[51] Int. Cl.³ .................. H04M 3/50; H04M 5/06
[52] U.S. Cl. ..................... 179/27 D; 179/27 FH; 179/27 F; 179/99 R
[58] Field of Search ............... 179/99 R, 6.17, 18 B, 179/18 BD, 27 D, 27 FH, 27 CA, 175.2 C, 27 DA, 27 DB, 27 FF

[56] References Cited

U.S. PATENT DOCUMENTS

| | | | |
|---|---|---|---|
| 2,787,741 | 4/1957 | Bretschneider | 317/139 |
| 2,883,471 | 4/1959 | Germanton | 179/27 D |
| 2,923,777 | 2/1960 | Schneider | 179/27 D |
| 3,142,728 | 7/1964 | MacLeod | 179/27 D |
| 3,275,754 | 9/1966 | Howell et al. | 179/18 |
| 3,297,829 | 1/1967 | Germanton | 179/27 D |
| 3,334,191 | 8/1967 | Arseneau et al. | 179/27 D |
| 3,478,174 | 11/1969 | MacLeod et al. | 179/18 BD |
| 3,553,385 | 1/1971 | Morgan et al. | 179/18 BD |
| 3,557,317 | 1/1971 | Porter | 179/27 D |
| 3,577,155 | 5/1971 | Swierczewski | 179/27 D |
| 3,643,034 | 2/1972 | Burns et al. | 179/27 D |
| 3,692,948 | 9/1972 | Warner | 179/27 D |
| 3,692,950 | 9/1972 | Lecoanet et al. | 179/27 D |
| 3,701,855 | 10/1972 | Reynolds | 179/18 ES |
| 3,702,380 | 11/1972 | Gueldenpfenning et al. | 179/27 D |
| 3,752,936 | 8/1973 | Morse | 179/27 D |
| 3,780,227 | 12/1973 | Pirnie, Jr. et al. | 179/27 D |
| 3,789,153 | 1/1974 | Malm | 179/27 D |
| 3,806,665 | 4/1974 | Goldberg | 179/99 H |
| 3,809,822 | 5/1974 | Jacobs et al. | 179/27 D |
| 3,869,581 | 3/1975 | Paschal, Jr. et al. | 179/18 H |
| 3,887,902 | 6/1975 | Labalme | 179/18 ES |
| 3,927,271 | 12/1975 | Acevedo | 179/18 AB |
| 3,943,290 | 3/1976 | Golden | 179/6 C |
| 3,969,589 | 7/1976 | Meise, Jr. et al. | 179/27 D |
| 4,048,452 | 9/1977 | Oehring et al. | 179/27 D |
| 4,066,847 | 1/1978 | Giordano | 179/99 H |
| 4,078,158 | 3/1978 | Houee et al. | 179/27 D |
| 4,109,113 | 8/1978 | Allison et al. | 179/99 H |
| 4,145,578 | 3/1979 | Orriss | 179/27 FF |
| 4,289,934 | 9/1981 | Pitroda et al. | 179/27 D |

Primary Examiner—Gerald L. Brigance
Attorney, Agent, or Firm—Donald A. Kettlestrings

[57] ABSTRACT

A position load distribution (PLD) and management system for use with an existing key telephone system (KTS) wherein the KTS typically has a plurality of incoming lines and a plurality of agent-serviced positions. The PLD directs an incoming call to an available position which has been idle the longest since its last on-line condition by directing that position to answer the call. The PLD system of this invention can be fitted to an existing KTS without modifying the KTS equipment except for substitution of special line cards for the KTS line cards. If an agent does not answer the incoming call in a predetermined time or all agent positions are busy, the system will automatically answer the call, provide a pre-recorded message and place the call on "hold" until an agent's position becomes available. When an agent's position becomes available the PLD system will direct that position to answer the call.

All activity such as the number of calls answered, calls originated, calls abandoned, calls transferred for each position and the system totals are made available via the console. Also the number of times all incoming lines were busy and the number of calls being held because all positions were busy are also available. This information, made available via the console, can be used to provide efficient management of both the equipment and personnel.

33 Claims, 11 Drawing Figures

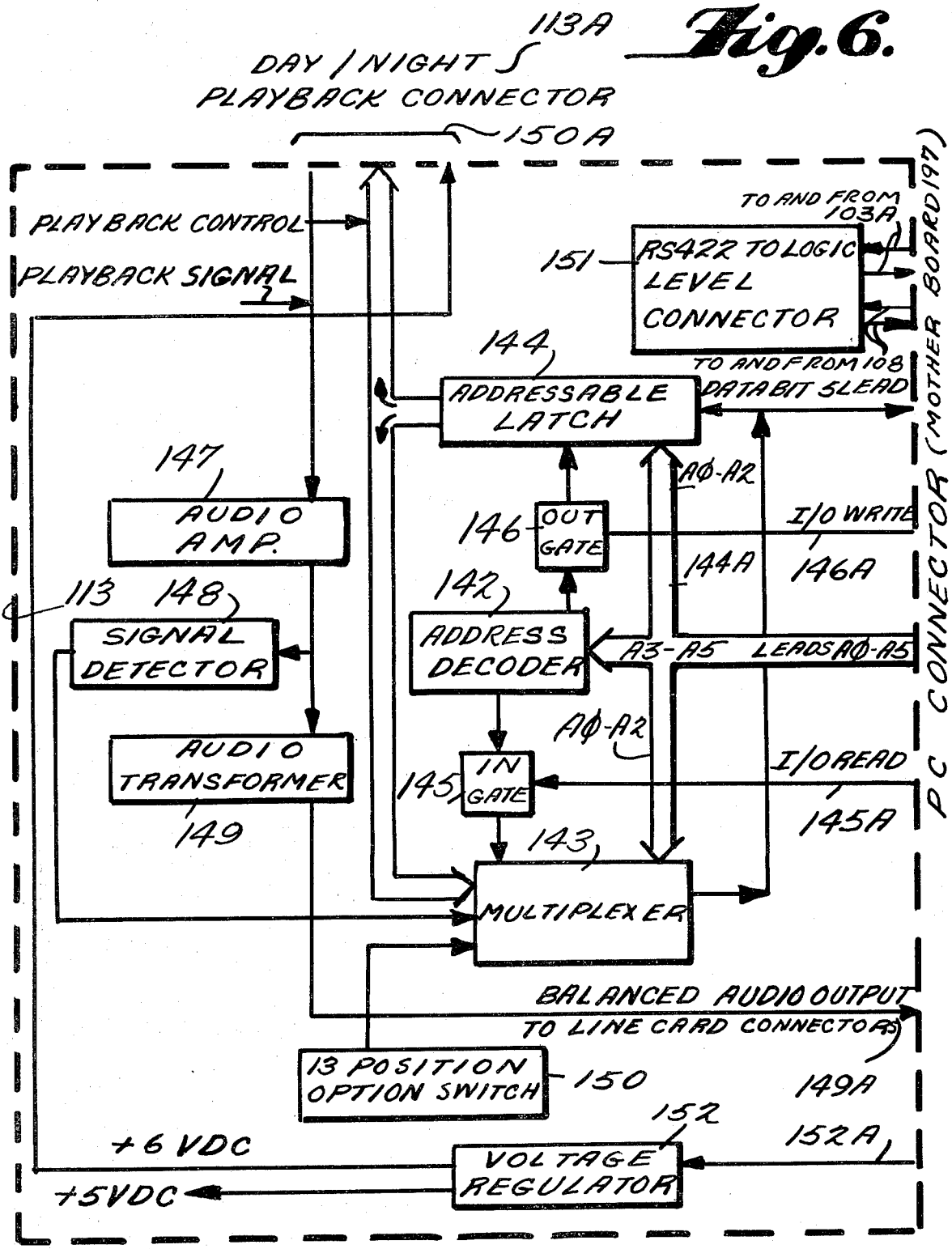

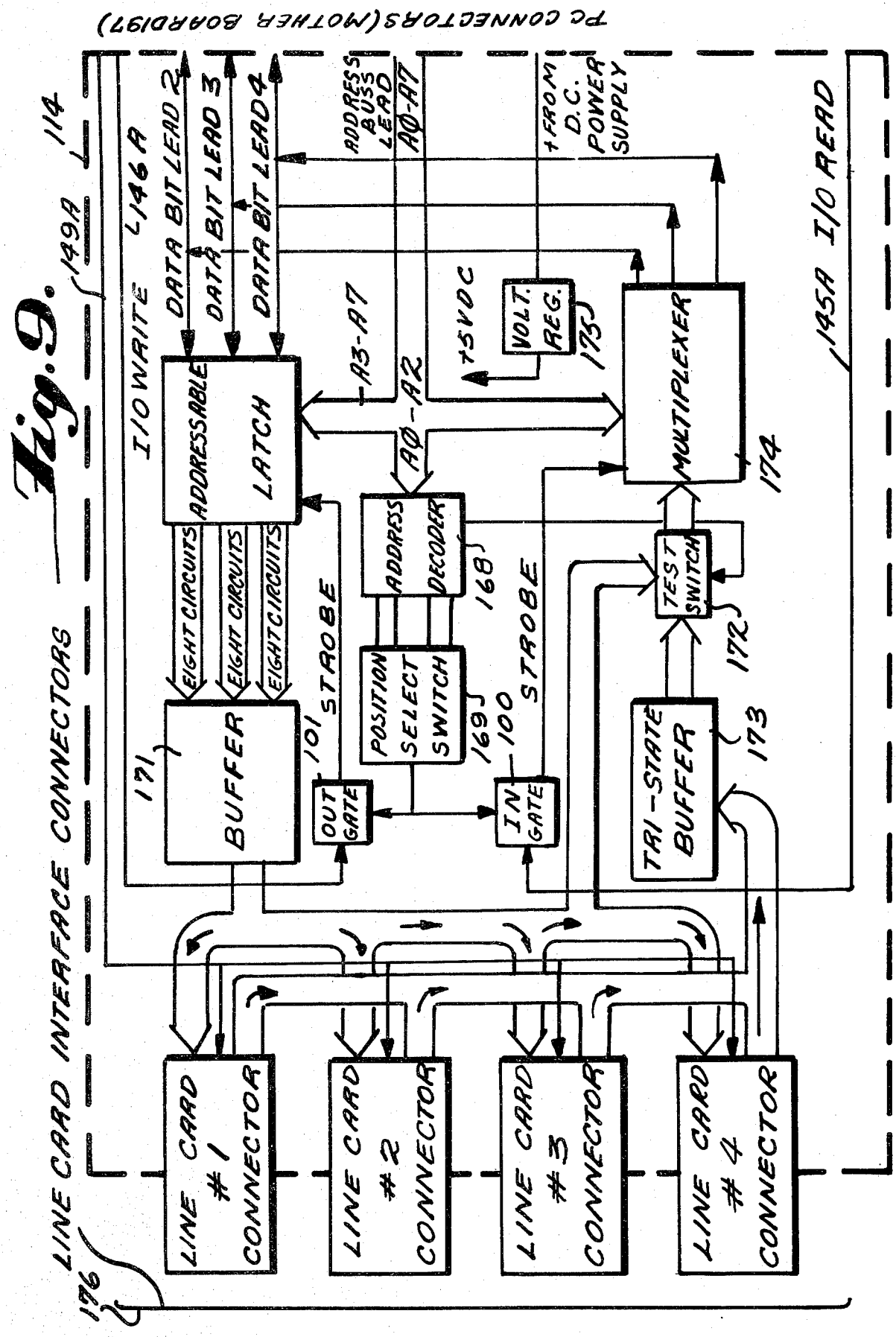

POSITION LOAD DISTRIBUTION AND MANAGEMENT SYSTEM FOR KEY TELEPHONE SYSTEMS

This invention relates to a telephone call distribution and management system and more particularly to such a system which allows an existing key telephone system to be quickly and efficiently modified whereby an agent-serviced position which has been idle the longest since its last on-line condition is directed to answer an incoming call.

With respect to key telephone systems, various types of automatic call answering and sequencing systems are known in the art. None of these known systems provides for the distribution of incoming calls to operator positions. Still other known systems provide for incoming calls to be distributed to the first available operator in order of the call's arrival, but these systems are completely self-contained and are not adapted to be integrated into existing key telephone systems.

Although such known systems have performed adequately in attempting to equalize operator load, they have not always equitably distributed the workload among a plurality of operator positions, and they have not enabled existing key telephone systems to be modified to provide for equitable workload distribution.

In those systems which direct incoming calls through operator positions so that an operator will not handle a second call until all other operators have handled a first call, it frequently happens that operators who have received preceding calls will be occupied on the line for a longer time than those operators who receive later incoming calls. As a result, operators positioned early in the sequence may be called upon to handle a second call after they have been idle only a very short time while operators located later in the sequence may be idle for a considerably longer time before they are required to handle an additional incoming call.

A truly equitable distribution of the workload among a plurality of operator positions is accomplished by directing each incoming call to that operator position which has been idle for the longest time since its last on-line condition. None of the systems presently known distribute incoming calls in this manner, and none of the systems presently known enable an existing key telephone system to be modified to incorporate this advantageous feature.

It is, therefore, an object of the present invention to provide a system for modifying an existing key telephone system for equitably distributing incoming telephone calls among a plurality of agent-serviced positions in the key telephone system.

Another object is to provide for such a call distribution system for modifying an existing key telephone system wherein distribution of incoming calls to agent-serviced positions in the key telephone system is accomplished by directing each arriving call to the agent position which has had the longest idle time since its last on-line condition, by directing that agent position to answer an incoming call.

A further object of the invention is the provision of such a call distribution system wherein distribution is accomplished by providing the selected agent with an audible or a visual indication to answer the incoming call.

Still another object is to provide such a system which will automatically answer an incoming call or calls when an agent does not respond in a predetermined time or all agent positions are busy.

Still another object is to provide such a system which provides a pre-recorded announcement when an incoming call is automatically answered and which places the call on "hold" until any agent position becomes available.

Yet another object of the present invention is to provide such a system wherein a pre-determined response is provided to incoming calls when no agents or a limited number of agents are available, such as after normal business hours or weekends and holidays. For example, when no agents are available or no agent positions are manned, the system can be set to answer all incoming calls, provide a pre-recorded announcement and then disconnect. If a limited number of agents are available, the system can be set to distribute all incoming calls to one or more agent positions and if not answered in a predetermined time to automatically answer the call, provide a pre-recorded announcement and then distribute the call or calls to an available agent position.

A still further object of the present invention is to provide such a system having means to change the system configuration and position status, and to monitor or obtain data on the system and agent positions' activities. A console is provided for this function. The console preferably contains a twenty button key pad, a forty character alfa-numerical readout display and an output for use with a printer. The console preferably provides for the following functions:

1. Places any agent position out of service to incoming calls or returns it to in service.
2. Places any agent position in the night mode to be available to respond to incoming calls after normal business hours.
3. Tests any agent's position to determine if the audible or visual indication functions and position's response when off hook is recognized.
4. Obtains for any position or the system totals the following:
   a. Calls answered
   b. Calls originated
   c. Calls abandoned
   d. Calls transferred due to non response
   e. Number of times all incoming lines were busy
   f. Number of calls answered automatically because all positions were busy
   g. Number of calls being held automatically because all positions are busy
   h. Number of lines in use
5. Obtains the date and time.

Still another object of the present invention is to provide such a system having means to control and obtain status from the key telephone system (KTS). A special KTS line card is provided as part of the position load distribution system of this invention and the special line card is used to replace the standard KTS line card. The special line card of this invention provides the standard KTS line card functions and it also enables the position load distribution system of this invention to perform the following functions:

1. Control the lamp indications at the agent position
2. Answer and place on "hold" an incoming call
3. Disconnect a line on "hold"
4. Connect the pre-recorded message to a line on "hold"
5. Monitor the hold status
6. Monitor the "A" lead status Additional objects and advantages will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides a position load distribution and management system for use with and modification of existing key telephone systems wherein incoming calls are distributed among available operator positions to a position having the longest idle time since its last on-line condition, by directing that operator position to answer an incoming call. The present invention also provides for automatically answering incoming calls if all agent positions are busy, providing a pre-recorded message and placing the calls on "hold" until any agent's position becomes available. The present invention also provides for monitoring all activity such as the number of calls answered, calls originated, calls abandoned, calls transferred for each position and the system totals.

It is to be understood that the foregoing general description and the following detailed description are exemplary and explanatory but are not restrictive of the invention.

The accompanying drawings, which are incorporated in and constitute a part of this specification, illustrate an example of a preferred embodiment of the invention and, together with the description, serve to explain the principles of the invention.

FIG. 6 is a functional block diagram of the input/output (I/0) module, which is part of the PLD and provides the necessary input and output ports to support the console and the pre-recorded message announcers;

FIG. 9 is a functional block diagram of the line card interface module which is part of the PLD and provides circuitry necessary to obtain status from and provide control to the special KTS line card located in the KTS system;

Figure 11:
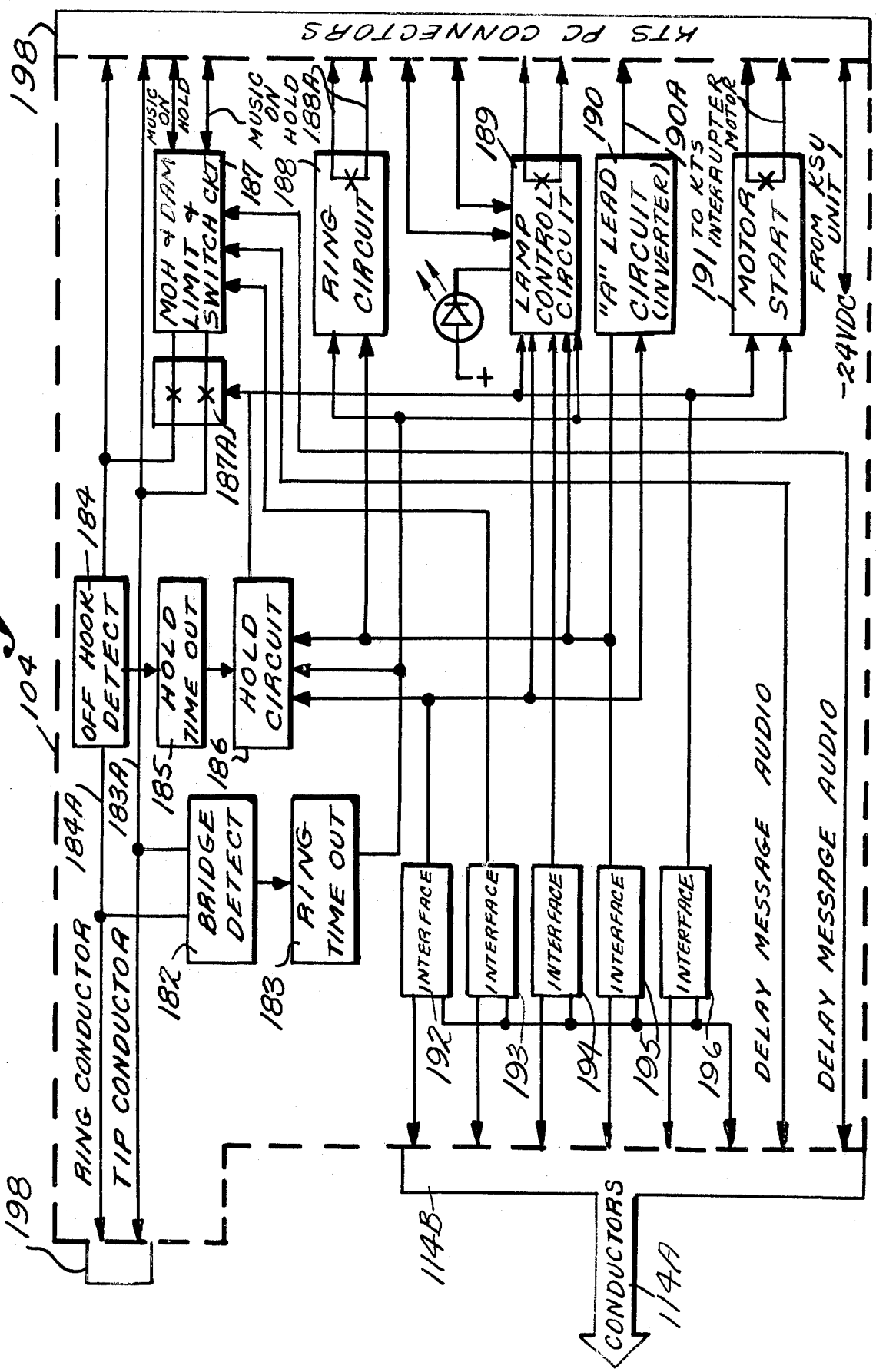

FIG. 10 is a block diagram of the power supply module which is part of the PLD and provides all PLD modules with the necessary DC power; and FIG. 11 is a functional block diagram of the special KTS line card which is provided with the PLD but is located in the KTS enclosure. It provides the circuitry necessary for the PLD to obtain status of the incoming lines and to exercise control of specific functions.

Figure 1:
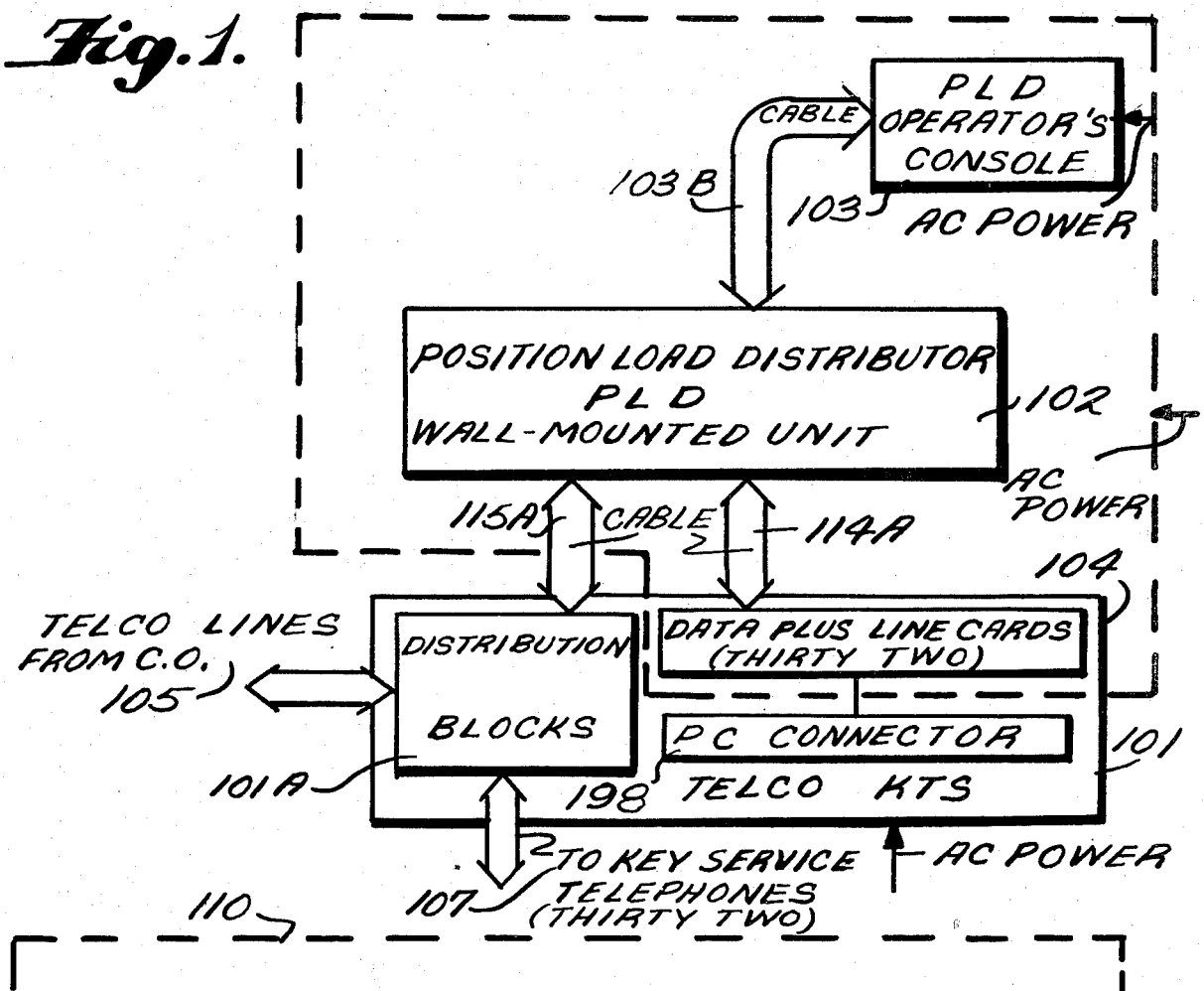
FIG. 1 is a block diagram of the position load distributor and its relationship with the key telephone system.

With reference now to the drawings, wherein like reference characters designate like or corresponding parts throughout the several views, there is shown in FIG. 1 a position load distribtor (PLD) system and its relationship to a key telephone system (KTS).

Key telephone 101 is normally a system manufactured and installed by others to allow the user to have a plurality of incoming lines connected to a plurality of agent positions. Position load distributor 106 when installed in connection with KTS 101 will provide distribution of incoming calls among agent-positions to an available position having the longest idle time since its last on-line condition, by directing that agent position to answer an incoming call, and will provide automatic answering, position control and data to assist in management. PLD console 103 is normally remoted to a supervisory location. KTS unit 101 will contain special line cards 104 to enable the PLD to obtain control and to monitor the status of each line.

PLD 106, as illustrated and described, can accomodate up to thirty two telephone company (TELCO) lines 105 and up to thirty two agent positions 107. Of course, the PLD system can be readily modified to accomodate more or fewer telephone company lines and agent positions.

Figure 2:
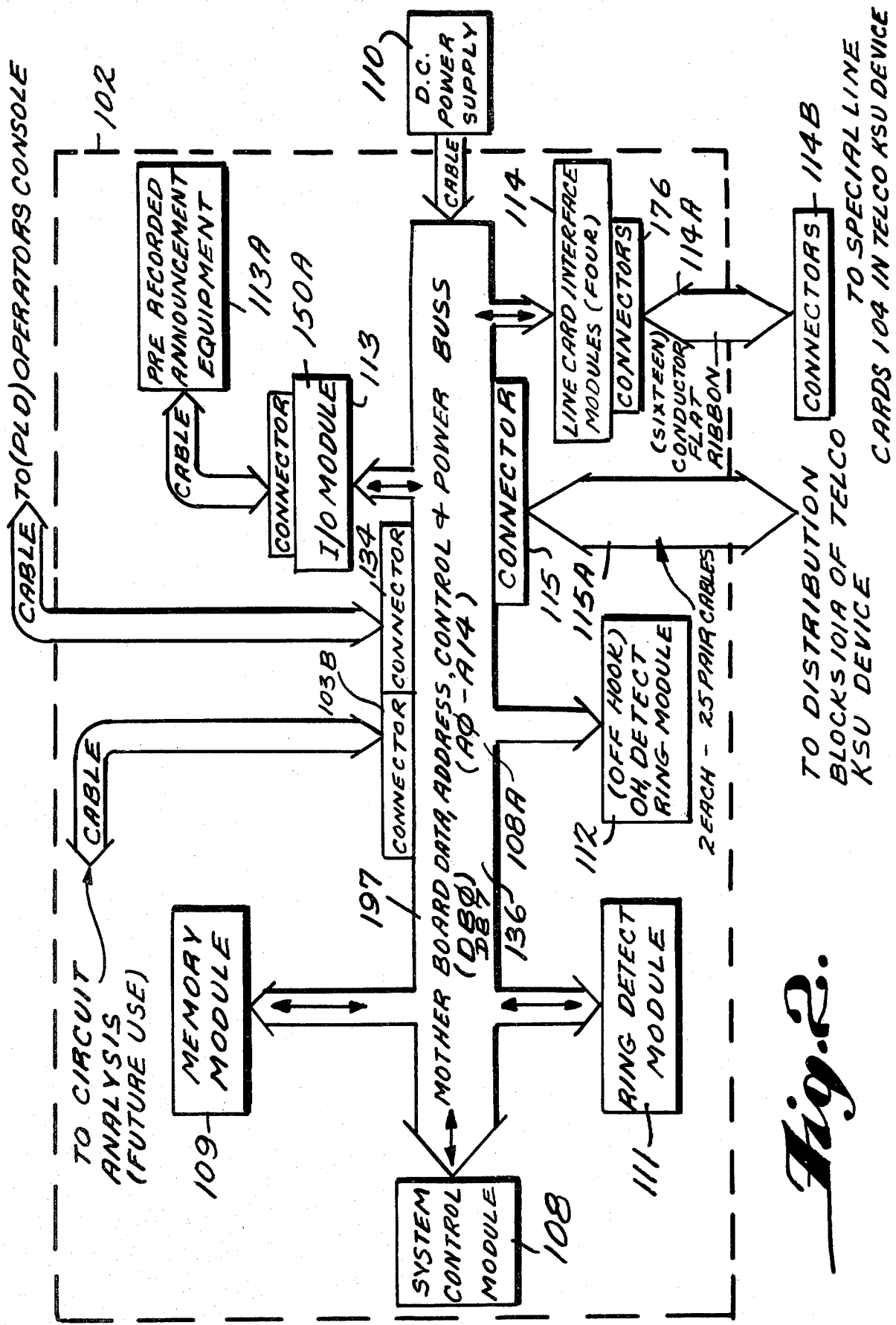
FIG. 2 is a block diagram of the position load distributor (PLD)

Referring now to FIG. 2 there is shown a functional block diagram of the PLD microprocessor and associated interfaces.

System control module 108 contains the microprocessor, module addressing, system clock and other circuitry necessary for it to function as defined by the computer program located in memory module 109. These two modules, containing standard microprocessor technology, service all other modules 111, 112, 113 and 114 as prescribed by the written program. System control module 108 can read from or write to any of the other modules by addressing the module and its function via address buss 108A which has leads A0–A14.

Connector 115 is used to connect into the KTS distribution blocks to obtain the ring indication, to activate an audible or visual indication at an agent position and to monitor the off hook status of each of the agent's instruments.

Power supply 110 is used to provide the necessary DC voltage to operate the logic and other devices.

Figure 3:
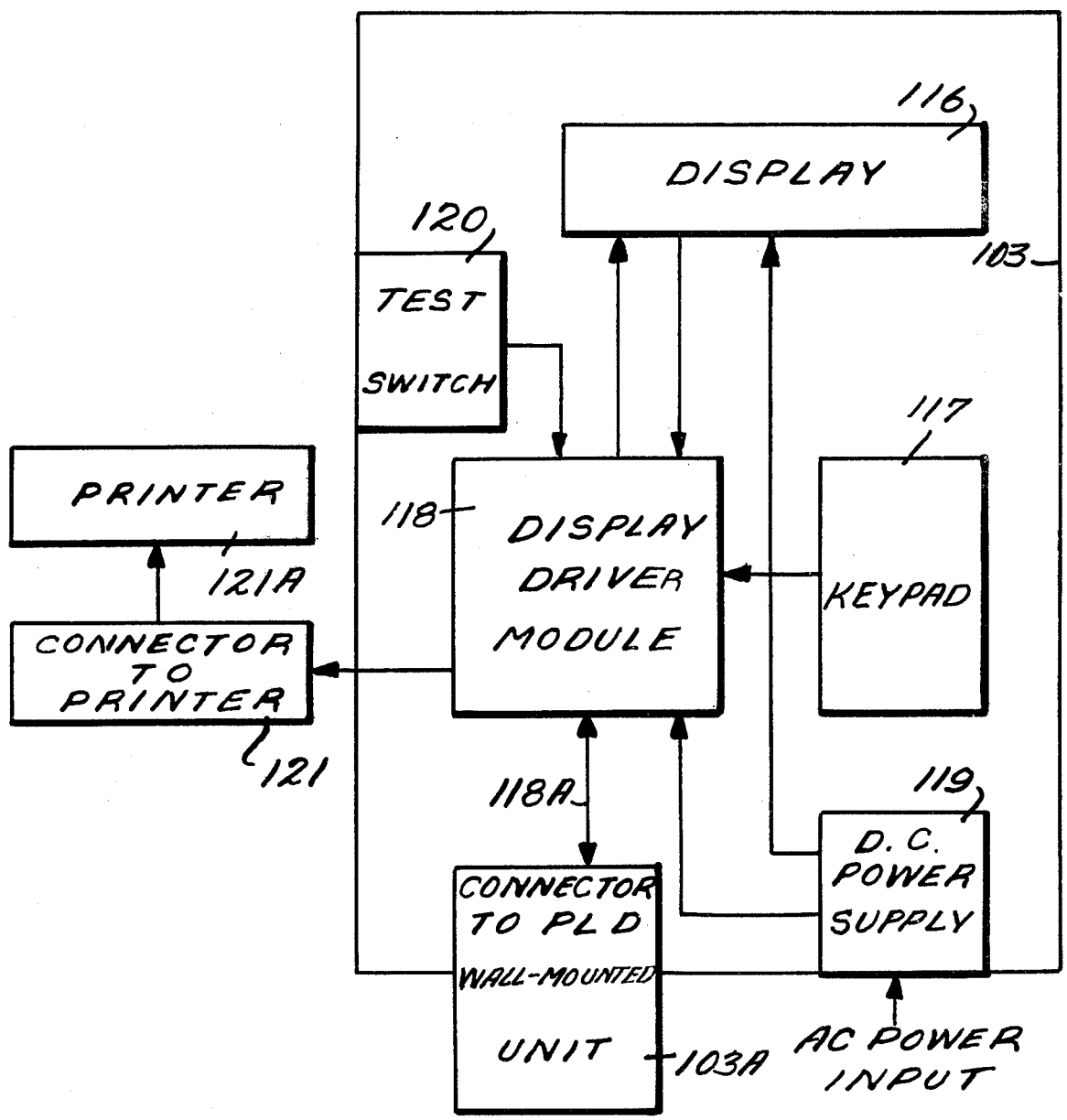
FIG. 3 is a block diagram of the PLD's console.

With reference now to FIG. 3 there is shown a functional block diagram of PLD console 103. The console, in this embodiment, contains a forty character alphanumeric display 116. Display 116 is used to provide a visual readout of the system's status, system activity, position status and position activity as requested by an operator. It also indicates the request made by an operator.

Console 103, in the preferred embodiment, also contains a twenty button key pad 117 which is used to select the data to be viewed on display 116. Key pad 117, for example, sends a request to system control module 108 (FIG.2) via four chip integrated circuit display driver module 118. Module 118 converts parallel binary data from key pad 117 into bit serial data and transmits the seria data over a pair of metallic conductors 118A to PLD unit 102 and into I/O module 113 (FIG. 2) via mother board circuitry 197 and to system control module 108.

A D.C. power supply 119 is used to provide the necessary voltage to display 116 and to display driver module 118.

A test switch 120 provides a means of locally testing display 116 and key pad 117.

A twenty-five pin connector 121 is provided in this embodiment to connect a printer 121A with an EIA standard RS232 interface (not shown) to copy the data that appears on display 116. The EIA standard RS 232 interface is a chip within module 118.

Figure 4:
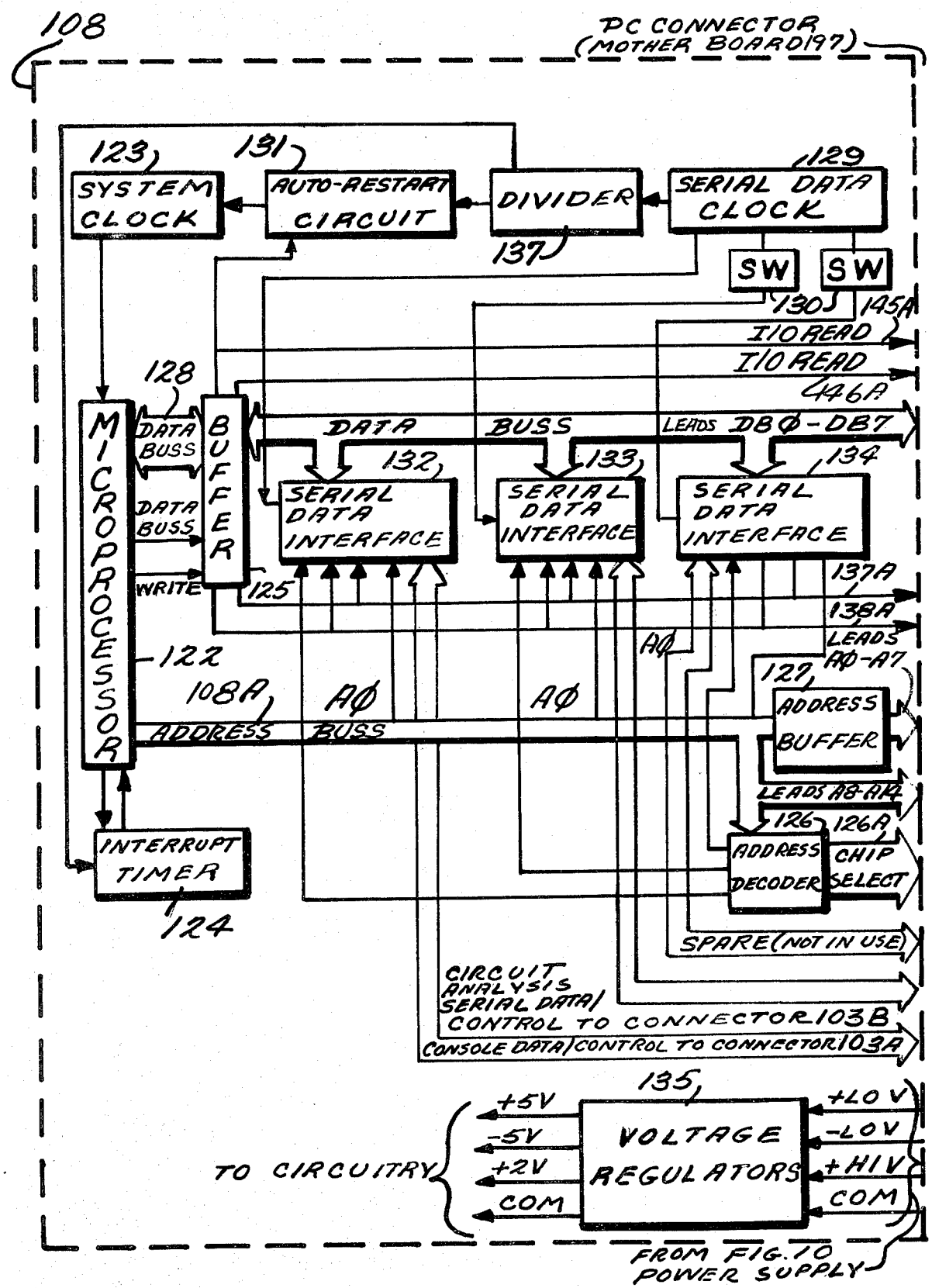
FIG. 4 is a functional block diagram of the system control module which is part of the PLD and contains the microprocessor and associated circuits.

Referring now to FIG. 4 there is shown a functional block diagram of system control module 108. This module is the heart of the system of this invention and contains microprocessor 122 and system clock 123. They perform all of the logical decisions and actions as defined by the computer program stored in memory module 109 (FIG. 2). These decisions and actions are performed on information received over data buss 128. To obtain information or initiate an action, microprocessor 122 must address a specific module and a specific function. It does this via address decoder 126 which will enable a specific module to respond to a request made via address buss 108A. Address buss 108A is buffered by address buffer 127, which allows a plurality of modules to use a common address buss.

Microprocessor 122 has the ability to communicate with other devices which are not located within PLD enclosure 102 and which are not available to the address and data busses. This communication, such as that to console 103, is accomplished via serial data interfaces 132, 133, and 134. Specifically, communication to console 103 is accomplished through serial data interface 132. Each serial data interface 132, 133 and 134 takes parallel data from data buss 136, when addressed to do so, and converts it to bit serial data at a speed defined by serial data clock 129, and where applicable by the selection of the baud rate switches 130. Microprocessor 122 must make some of its decisions based on elapsed real time. This elapsed time is calculated by the number of interruptions which the microprocessor receives from interrupt timer 124. Interrupt timer 124 receives its basic time from serial data clock 129 via divider 137.

To protect the system against outside influences such as power failure and interfering noise, an automatic restart circuit 131 is provided. It monitors the input/output (I/O) port of buffer 125 and if it does not see an I/O instruction within a predetermined time, it will instruct microprocessor 122 to stop what it is doing and return to the start of the program.

System control module 108 also contains its own voltage regulators 135 which take the unregulated voltage from main power supply 100 (FIG. 2) and regulates it to necessary levels as required by the circuitry.

Figure 5:
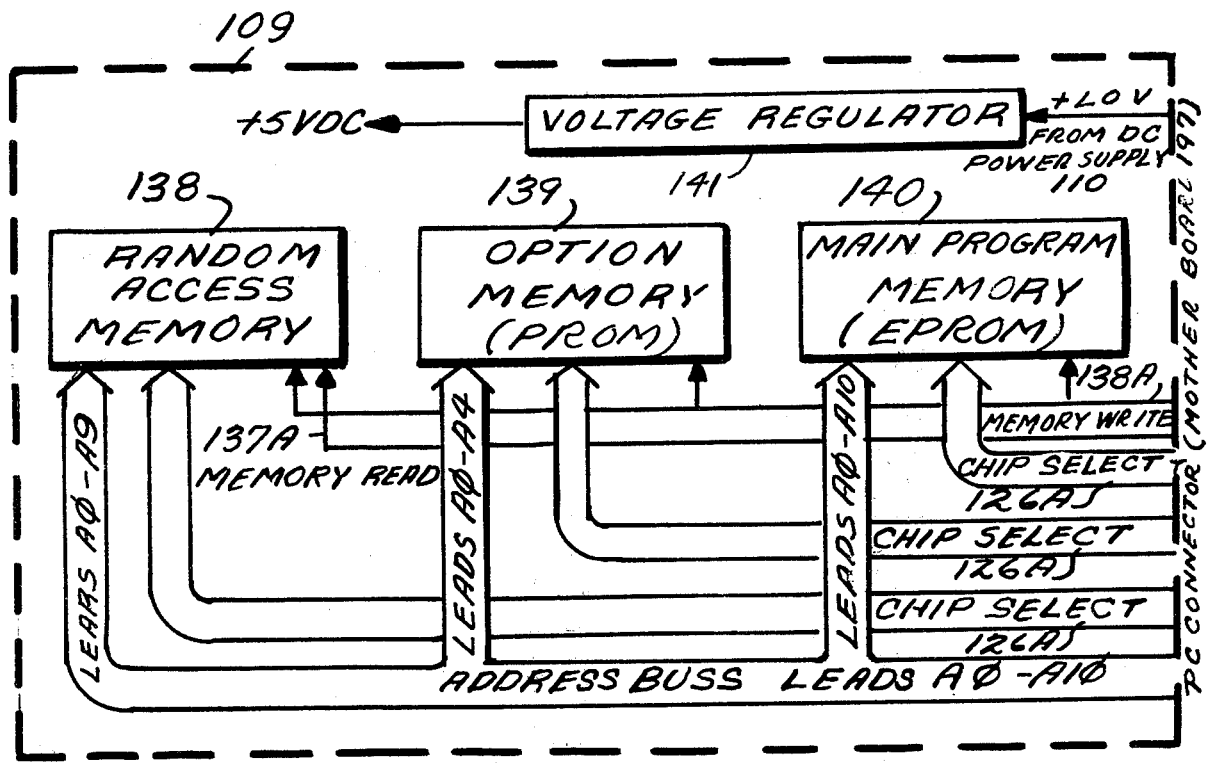
FIG. 5 is a functional block diagram of the memory module which is part of the PLD and contains the necessary memory to support the computer program.

In FIG. 5 there is shown a functional block diagram of memory module 109. This module contains three types of memory devices. The first is random access memory 138 used for storage of real time information such as totals of calls answered by a position. Memory 138 can be written into by microprocessor 122 via memory write 138A. A second memory type is the optional memory programmable read only memory (PROM) 139. Memory 139 is used to select optional system configurations and parameters. Memory 139 can not be changed by microprocessor 122, only read by it. The third memory type is the main program memory-electrically programmable read only memory (EPROM) 140. Memory 140 is used to store the main computer program which directs microprocessor 122 and all of the associated modules to perform the functions of position load distributor (PLD) 102. Microprocessor 122 can not alter memory 140.

Memory module 109 also contains its own voltage regulator 141 which takes unregulated voltage from main D.C. power supply 110 and regulates it to a level required by the module circuitry.

Referring to FIG. 6 there is shown a functional block diagram of input-output (I/O) module 113. This module is used to control pre-recorded message announcers 113A, identify the number of lines and positions that will be used in the KTS configuration and provide the interface circuitry necessary to communicate with console 103. Module 113 contains an address decoder 142 which, when addressed by microprocessor 122, will allow data to be read from or data to be entered into module 113 upon a read or write command sent to "in" gate 145 via I/O read conductor 145A or to "out" gate 146 via I/O write conductor 146A, respectively.

Addressable latch 144 is used to hold the incoming data that will appear on data bit five lead. Addressable latch 144 contains eight latches which can be individually addressed by the A∅-A2 address leads 144A. This allows information on the data bit five lead to be read by microprocessor 122. This information indicates the status of pre-recorded message announcers or conventional tape recorders 113A and the positions of option switches 150, which provide the user with various user options as determined by main program memory 140 (FIG. 5).

"In" gate 145 is used to place the output of multiplexer 143 onto the data bit five buss when address decoder 142 is in coincidence with an I/O read command from control module 108.

"Out" gate 142 is used to enter data into latch 144 from the data bit five lead when address decoder 142 has recognized its address and is in coincidence with the I/O write command from control module 108.

The audio from pre-recorded announcer 113A is connected into module 113 via connector 150A. The audio is amplified by audio amplifier 147 and is connected to each of the special line cards 104 via common audio transformer 149 and through line card interface module 114. A signal detection circuit 148 is used to detect the idle or quiet period from the audio output of announcers 113A. This quiet period, occurring after an active period, indicates to microprocessor 122 that the pre-recorded message is completed.

Also contained within module 113 is a standard circuit 151 used to convert the logic level signals to levels specified by the EIA RS422 specifications for transmitting data over a balanced pair of metallic conductors.

Module 113 also contains a voltage regulator 152 for regulating the unregulated voltage from main D.C. power supply 110 received via conductor 152A.

Figure 7:
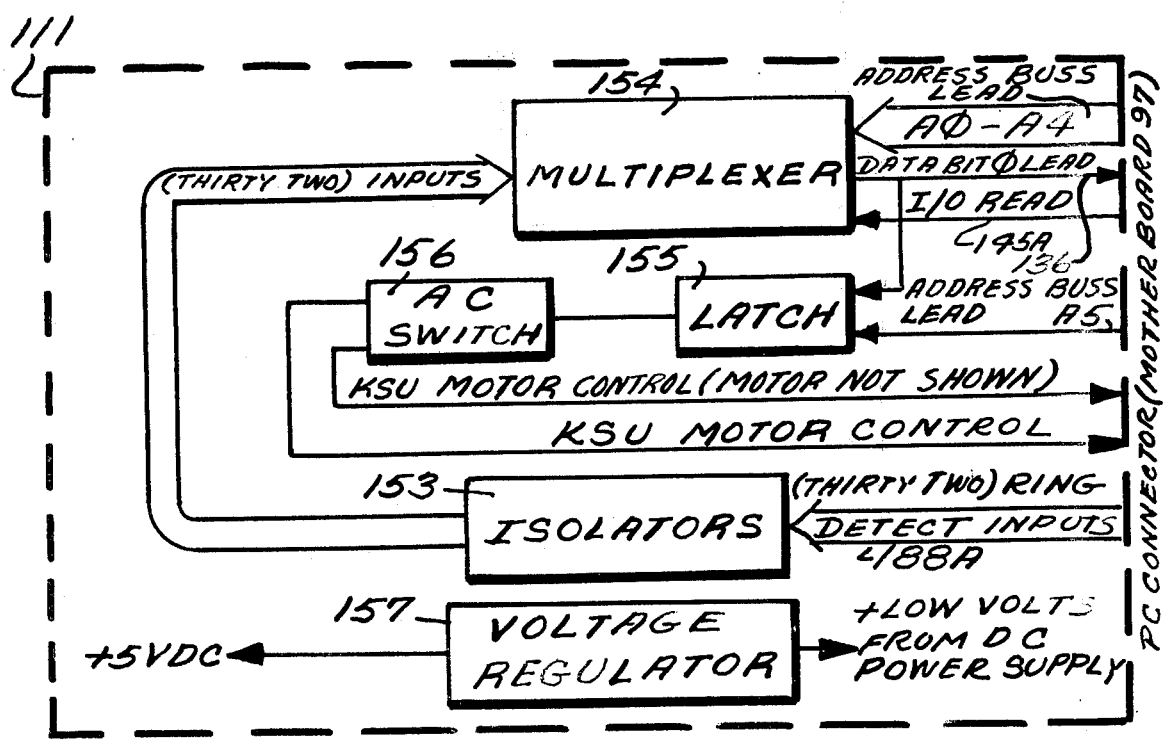
FIG. 7 is a functional block diagram of the ring detect module which is part of the PLD and provides circuitry necessary for the PLD to detect when a line has an incoming ring present.

Referring to FIG. 7 there is shown a functional block diagram of ring detect module 111. This module is used to interface with KTS distribution block 101A (FIG. 1) and to couple the ring indication that occurs in special line card 104. Information from each of up to thirty two special line cards, in accordance with the preferred embodiment, is coupled into module 111 via optical isolators 153. The output of each of the isolators is connected to one of thirty two inputs of multiplexer 154. When the multiplexer is addressed via the A∅-A4 address leads, the ring status of each incoming line can be presented to microprocessor 122 via data bit ∅ lead 154A.

Also contained within module 111 are latch 155 and AC switch 156 used to activate a common audible or visual indication of an incoming call. Latch 155 is addressed by address bit A5 and is set in accordance with data on data bit 0 lead 136.

Module 111 also contains a voltage regulator 157 which is used to regulate the unregulated voltage from main D.C. power supply 110.

Figure 8:
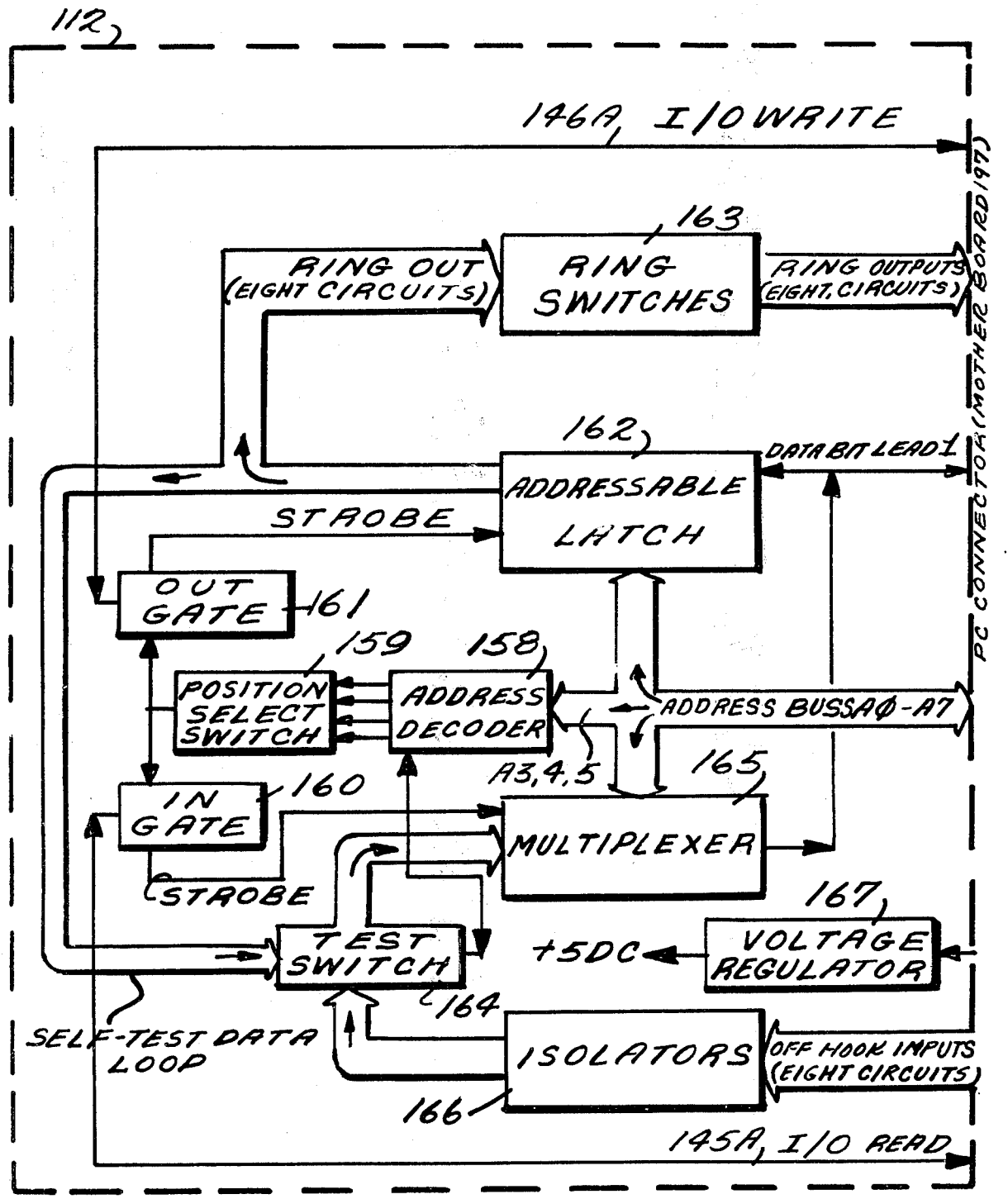
FIG. 8 is a functional block diagram of the off hook/ringing module which is part of the PLD and detects when an agent has placed his position in the off hook state, and provides the circuitry necessary for the PLD to generate either an audible signal or visual signal at the agent positions.

With reference now to FIG. 8 there is shown a functional block diagram of an OH (off hook) detect/ringing module 112. This module has two functions to perform. The first is the activation of the audible or visual indicator at the agent's position to direct that position to answer the incoming call. The second function is to monitor the OH (off hook) status of the agent's position. Each module 112 is designed to support eight agent's positions. Since the PLD system of this invention is capable of servicing up to thirty two agent positions, it is necessary that PLD 102 accomodate up to four OH detect/ringing modules 112. Each module 112 is designed to be common to the four module requirement and each is switch selected to be the first, second, third, or fourth module.

Address decoder 158 and position select switch 159 are used to address the desired one of the four modules 112. When selected, a ring switch 163 may be activated or de-activated by addressing addressable latch 162 and by setting the data bit one lead to the desired state. The status of the eight latches in addressable latch 162 are also connected via test switch 164 to inputs of multiplexer 165, and when a latch is so addressed its status can be presented back to microprocesser 122 on the data bit one lead.

Multiplexer 165 is also used to present the status of isolators 166, each of which reflects the off hook status of the attached agent position. This is electrically accomplished by removing the position's A1 lead (not shown) from the common ground return (not shown) at the KTS (Key Telephone System) cabinet and rerouting it via the PLD cabling from KTS distribution blocks 101A to optical isolator 166 and then to the common ground. When the position goes "off hook", the electrical current from the common ground now passes through isolator 166 creating an indication to this module.

"In" gate 160 is used to place the output of multiplexer 165 onto the data bit one buss when address decoder 158 has recognized its address and is in coincidence with the I/O read command on line 145A from control module 108.

"Out" gate 161 is used to enter data into latch 162 from the data bit one buss when address decoder 158 recognizes its address, the position selected is set to the correct setting and these are in coincidence with the I/O write command on lead 146A from control module 108.

Module 112 also contains a voltage regulator 167 to regulate the unregulated voltage from main D.C. power supply 110.

In FIG. 9 there is shown a functional block diagram of a line card interface module 114. This module is used to interface PLD 102 to special line cards 104 located in the KTS cabinet 101. Module 114 provides PLD 102 with the status of the special line card "A" lead 190A (FIG. 11) and of its "hold" condition. Module 114 also provides PLD 102 with a means of answering a call and placing it in the "hold" state. Module 114 provides PLD 102 with a means to control the telephone position's lamp display, and it provides the PLD with a means to disconnect a call placed on hold. Module 114 also provides a means of connecting the incoming caller to pre-recorded message announcer 113A.

Module 114 is designed to interface with up to eight special line cards 104. Since the preferred PLD system described is capable of servicing up to thirty two special line cards 104, it is necessary that the PLD accomodate up to four modules 114. Each module 114 is designed to be common to the four module requirement and is switch selected to be the first, second, third or fourth module.

Address decoder 168 and position select switch 169 are used by microprocessor 122 (FIG. 4) to select one of the four line card interface modules 114. Addressable latches 170 provide storage for a total of eight sets of three functions. These latches are addressed by address bits A3-A7 and by data entered into the latches from data bit two, three and four leads. The outputs of latches 170 are applied to the inputs of buffer 171 which provides the necessary power amplification to drive optical isolators 192-196 (FIG. 11) on the special line cards located in the KTS cabinet 101 and connected to modules 114 via connectors 176. Buffer 171 outputs are also applied to test switch 172 and when switch 172 is addressed via address decoder 168 the switch passes the state of each latch back to microprocessor 122 via multiplexer 174 and data bit leads two, three and four.

"In" gate 100 is used to place the output of multiplexer 174 onto the data bit two, three and four busses when address decoder 168 has recognized its address and is in coincidence with the I/O read command on line 145A from control module 108.

"Out" gate 101 is used to enter data into latches 170 from the data bit two, three and four busses when address decoder 158 recognizes its address, the position selected is set to the correct setting and these are in coincidence with the I/O write command on lead 146A from control module 108.

Tri-state buffer 173 in conjunction with test switch 172 and multiplexer 174 pass back to microprocessor 122, when addressed, the status of the special line card's 104 "A" lead function and the "hold" function.

Each line card interface module 114 is equipped with four connectors 176 which are used to interconnect module 114 with the special line cards 104, and each connector 176 provides the connection for two special line cards 104.

Module 114 also contains a voltage regulator 175 used to regulate the unregulated voltage from primary D.C. power supply 110.

Referring to FIG. 10 there is shown a functional block diagram of primary power supply 110. This power supply provides the necessary plus and minus DC voltages to each of the modules of the system as may be required for operation.

The power supply, a self-contained module, contains a power line filter 177 to reduce both external noise from entering and internal noise from exiting. The AC power which is brought into the supply via filter 177 is connected to transformer 178 via fuse 178A. The secondary voltage of transformer 178 is connected to a bridge rectifier 179 where it is converted to DC voltages. These voltages are filtered by capacitor filter 180 to provide a source of unregulated DC voltages to all of the modules. Test points and lamps 181 are provided to assist in trouble shooting and observing the condition of the supply.

With reference now to FIG. 11 there is shown a functional block diagram of a special line card 104 in accordance with the invention. This line card is used in the KTS enclosure 101 and replaces the existing standard line card when the PLD system of this invention is installed. Line card 104 is connected to the KTS via PC (printed circuit) connector 198.

Line card 104 contains a ring detection circuit 182 which bridges tip and ring conductors 183A, 184A of the incoming line. When a ring voltage is present, ring detector circuit 182 activates a ring time out circuit 183 and closes a set of relay contacts 188 which are used to activate isolator circuit 153 on PLD ring detection module 111 (FIG. 7) via leads 188A. Ring detection circuit 182 also provides a relay contact closure 191 for the KTS interruptor motor (not shown). Ring detection circuit 182 also controls lamp circuit 189 and causes a lamp flash indication to appear at all agent positions for that line.

When an agent answers the incoming call, a voltage level change is presented to "A" lead circuit 190 which turns off the ring indication to ring detection module 111, via ring circuit 188 and the flashing lamp indication is changed to a steady indication. Also, answering the call causes a closure across ring line 184A and DC current flows through OH detector 184. Detector 184, the associated hold time out circuit 185 and hold circuit 186 are used to place the incoming call on hold when the voltage level received at "A" lead circuit 190 is dropped before the "OH" voltage indication from the agent's position is dropped.

When line card 104 is placed into the "hold" condition the incoming line is connected to a music on hold-/delay answer message circuit 187 via relay contacts 187A. Circuit 187, under the control of PLD 102 via line card interface module 114 (FIGS. 2 and 9) can connect the incoming call to a pre-recorded delayed answer message or to music on hold if so provided by user.

Special line card 104, containing the circuitry necessary to perform the standard functions described above, also contains additional circuitry to provide the following functions:

1. Cause line card 104 to automatically answer and place on hold an incoming call when directed by the PLD via interface 195,
2. Cause line card 104 to connect an incoming call to either the music on hold source or the delayed answer message source via circuit 187 when directed by the PLD via interface 193,
3. Cause the lamp indication at the agent positions to be on and flashing for the line it represents when directed by the PLD via interface 192,
4. Observe the status of "hold" circuit 186 in line card 104 via interface 196,
5. Observe the status of "A" lead input 190 in line card 104 via interface 195, and
6. Cause the lamp indication at the agent positions to be on continuously for the line it represents when directed by the PLD via interface 194.

The following table sets forth a description, manufacturer and part number of the circuit and system elements used in this invention.

| ELEMENT | DESCRIPTION | MANUFACTURER | PART NUMBER |
| --- | --- | --- | --- |
| 101 | Key Telephone System | NOTE 3 | |
| 102 | Position Load Distributor | DP700-1 | Data Plus, Inc. |
| 103 | PLD Console | DP700-2 | Data Plus, Inc. |
| 103A | Modular Connector | Berg | 66011-002 |
| 103B | Modular Connector | Berg | 66011-002 |
| 104 | Line Card | DP4200 | Data Plus, Inc. |
| 105 | Telephone Lines | NOTE 4 | |
| 106 | PLD System | DP700 | Data Plus, Inc. |
| 107 | Telephone Cables | NOTE 4 | |
| 108 | System Control Module | D201-00080 | Data Plus, Inc. |
| 109 | Memory Module | D201-00083 | Data Plus, Inc. |
| 110 | Power Supply | C201-00085 | Data Plus, Inc. |
| 111 | Ring Detect Module | D201-00077 | Data Plus, Inc. |
| 112 | OH Detect/Ring Module | D201-00078 | Data Plus, Inc. |
| 113 | I/O Module | D201-00084 | Data Plus, Inc. |
| 114 | Line Card Interface Module | C201-00081 | Data Plus, Inc. |
| 114B | Connector, 10 pin | 3M | 3446-1302 |
| 115 | Connector, 25 Pair | AMP | 552118-1 |
| 116 | 40 Character Display | Industrial Electronic Engr. Inc. | 3600-02-040 |
| 117 | 20 button keypad | Digitran Co. | KL-0392 |
| 118A | Display Driver IC | AMD | 26LS32 |
| 118B | Key Pad Encoder IC | National | 74C923-20 |
| 118C | Uart IC | General Instrument | AY3-1014A |
| 118D | EIA Line Driver | NOTE 2 | 1488 |
| 119A | Transformer | Signal Corp. | ST-6-16 |
| 119B | Bridge Rectifier | General Instrument | WO4M |
| 119C | Regulator 5VDC | National | LM323 |
| 120 | Switch, Slide | ALCO | MSSA-425OR |
| 121 | Connector, EIA | Cinch | DB25S |
| 122 | Microprocessor IC | NOTE 1 | 8080A |
| 123 | System Clock IC | NOTE 1 | 8024 |
| 124A | Latch IC | NOTE 2 | 4013 |
| 124B | Counter IC | NOTE 2 | 4017 |
| 125 | Buffer IC | NOTE 1 | 8028 |
| 126 | Address Decoder IC | NOTE 2 | 74LS139 |
| 127 | Address Buffer IC | NOTE 2 | 74LS244 |
| 128 | Data Buss | NOTE 5 | |
| 129 | Baud Rate Clock IC | Motorola | MC14411 |
| 130 | 8 Position Dip Switch | Grayhill | 76SB08 |

-continued

| ELEMENT | DESCRIPTION | MANUFACTURER | PART NUMBER |
|---|---|---|---|
| 131A | Counter IC | NOTE 2 | 4024 |
| 131B | Comparitor IC | National | LM339 |
| 132 | Uart IC | NOTE 1 | 8251 |
| 133 | Uart IC | NOTE 1 | 8251 |
| 134 | Uart IC | NOTE 1 | 8251 |
| 135A | Regulator, 12VDC | NOTE 2 | 7812P |
| 135B | Regulator, 5VDC | National | MC322 |
| 135C | Regulator, 5VDC | NOTE 2 | 7905 |
| 136 | Data Buss | NOTE 5 | |
| 137 | Divider IC | NOTE 2 | 4013 |
| 138 | Random Access Memory | NOTE 2 | 2114 |
| 139 | PROM IC | Signetics | 82S123N |
| 140 | EPROM IC | NOTE 2 | 2716 |
| 141 | Regulator, Voltage | National Semi, Inc. | LM323 |
| 142 | Address Decoder IC | NOTE 2 | 74LS139 |
| 143 | Multiplexer IC | NOTE 2 | 74LS251 |
| 144 | Addressable Latch IC | NOTE 2 | 74LS259 |
| 145 | Nor Gate IC | NOTE 2 | 4001 |
| 146 | Nor Gate IC | NOTE 2 | 4001 |
| 147 | Audio Amp. IC | National Semi, Inc. | LM380N |
| 148 | Comparitor, IC | National | LM380N |
| 149 | Audio Transformer | United Transformer | SO-15P |
| 150 | Switch, Dip | Grayhill | 76SB05 |
| 150A | Plug, 6 pair | Molex Corp. | 09-81-1061 |
| 151 | RS422 Logic Level Con. IC | AMD | 26LS31 & 26LS32 |
| 152 | Regulator, Voltage | Motorola | MC7805CT |
| 153 | Isolator IC | NOTE 2 | 4N27 |
| 154 | Multiplexer IC | NOTE 2 | 74LS251 |
| 155 | Latch IC | NOTE 2 | 4013 |
| 156 | AC Solid State Switch IC | Motorola | MOC3031 |
| 157 | Regulator, Voltage | Motorola | MC7805CT |
| 158 | Address Decoder IC | NOTE | 74LS139 |
| 159 | Switch, Rotary | EECO | 230065 |
| 160 | Nor Gate IC | NOTE 2 | 4001 |
| 161 | Nor Gate IC | NOTE 2 | 4001 |
| 162 | Addressable Latch IC | NOTE 2 | 74LS259 |
| 163 | AC Solid State Switch IC | Motorola | MOC3031 |
| 164 | Switching IC | NOTE 2 | 74LS139 |
| 165 | Multiplexer IC | NOTE 2 | 74LS251 |
| 166 | Isolator IC | NOTE 2 | 4N27 |
| 167 | Regulator, Voltage | Motorola | MC7805CT |
| 168 | Nor Gate IC | NOTE 2 | 4001 |
| 169 | Switch, Rotary | EECO | 230065 |
| 170 | Addressable Latch IC | NOTE 2 | 74LS259 |
| 171 | Buffer IC | NOTE 2 | 74LS244 |
| 172 | Switching IC | NOTE 2 | 74LS139 |
| 173 | Buffer IC | NOTE 2 | 74LS244 |
| 174 | Multiplexer IC | NOTE 2 | 74LS251 |
| 175 | Regulator, Voltage | Motorola | MC7805CT |
| 176 | Connector, 10 Pin | 3M | 3446 |
| 177 | Power Line Filter | Cornell Dubilier | APF100CET |
| 178 | Power Transformer | Stancor | PCA-4 |
| 179 | Bridge Rectifier | Motorola | MDA980-1 |
| 180 | Capacitor Filter | NOTE 2 | 5300 UF  15VDC |
| 181A | Lamp LED | Litronix | RL2000 |
| 181B | Test Point | EF Johnson | 105-0751-001 |
| 182 | Isolator IC | NOTE 2 | 4N33 |
| 183A | Resistor, 330K Ohm | NOTE 2 | 330K Ohm ¼W 5% |
| 183B | Capacitor, 100 mfd | Sprague | 196D107X9020TE4 |
| 184 | Isolator | NOTE 2 | 4N27 |
| 185A | Resistor, 270K Ohm | NOTE 2 | 270K Ohm ¼W 5% |
| 185B | Capacitor, 2.2 mfd | Sprague | 150D225X9006A2 |
| 186 | Nand Gate IC | NOTE 2 | 4012 |
| 187 | Analog Switch IC | NOTE 2 | 4066 |
| 188 | Relay 6SPDP | C. P. Clare | LA0040D00 |
| 189 | AC Solid State Switch | Hutson Indus. | 1T210 |
| 190 | Inverter IC | NOTE 2 | 4069 |
| 191 | Relay 6SPDP | C. P. Clare | LA0040D00 |
| 192 | Isolator IC | NOTE 2 | 4N27 |
| 193 | Isolator IC | NOTE 2 | 4N27 |
| 194 | Isolator IC | NOTE 2 | 4N27 |
| 195 | Isolator IC | NOTE 2 | 4N27 |
| 196 | Isolator IC | NOTE 2 | 4N27 |
| 197 | Interconnecting Panel | Data Plus, Inc. | D 201-00087 |

NOTE 1 - Manufactured by Intel Corporation or National Semiconductor, Inc.
NOTE 2 - Available from numerous vendors
NOTE 3 - This unit is supplied by others
NOTE 4 - Not part of the PLD and supplied by the Telco's
NOTE 5 - Data Buss consists of copper lines on the mother board of the PLD unit.

The invention in its broader aspects is not limited to the specific details shown and described, and departures may be made from such details without departing from the principles of the invention and without sacrificing its chief advantages.

What is claimed is:

1. For use in combination with a key telephone system having a plurality of incoming telephone lines and a plurality of agent-serviced positions, an incoming call distribution and management system, comprising:
   means in operative relationship with said telephone system for distributing incoming telephone calls among said agent positions to an available position having the longest idle time since its last on-line condition, by directing said available agent position to answer an incoming call; and
   means in operative relationship with said distributing means and with said telephone system for automatically answering an incoming call if an agent position fails to answer said incoming call in a predetermined time or if all of said agent positions are busy.

2. A system as in claim 1 further including means in operative relationship with said telephone system and with said distributing means for controlling and testing the operative status of said agent positions.

3. A system as in claim 2 further including means in operative relationship with said telephone system and with said distributing means for collecting data about incoming telephone calls, agent position activity and system status.

4. A system as in claim 3 wherein said data includes the number of calls answered, the number of calls originated, the number of incoming calls abandoned, the number of incoming calls transferred for each agent position due to non response, the number of times all incoming telephone lines were busy, the number of incoming calls answered automatically because all agent positions were busy, the number of incoming calls being held because all agent positions are busy, and the number of telephone lines in use.

5. A system as in claim 1 wherein said answering means further include means for providing a pre-recorded message to said incoming call.

6. A system as in claim 5 wherein said answering means further include means in operative relationship with said message providing means for placing said incoming call on "hold" after said pre-recorded message has been provided to said incoming call.

7. A system as in claim 6 wherein said answering means further include means in operative relationship with said placing on "hold" means for directing said incoming call to the first available agent position.

8. A system as in claim 1 wherein said automatic answering means is set to automatically answering all incoming calls when no agent positions are in operation.

9. A system as in claim 8 wherein said answering means further include means for providing a second pre-recorded message to all of said incoming calls when no agent positions are in operation and then disconnecting all of said incoming calls after each of said incoming calls has received said second pre-recorded message.

10. A system as in claim 1 wherein said distributing means is set to distribute all incoming calls to one or more of said agent positions.

11. A system as in claim 10 wherein said answering means further include means for automatically answering said incoming calls if not answered in a predetermined time by said one or more agent positions.

12. A system as in claim 11 wherein said answering means further include means for providing a pre-recorded message to said incoming calls when none of said agent positions are manned or available to accept incoming calls.

13. A system as in claim 12 wherein said answering means further include means in operative relationship with said message providing means for placing said incoming calls on "hold" after said second pre-recorded message has been provided to said incoming calls.

14. A system as in claim 13 wherein said answering means further include means in operative relationship with said placing on "hold" means for directing said incoming calls to the first available of said one or more agent positions.

15. A system as in claim 1 wherein said distributing means include an electrical power supply and a system control module in operative relationship for receiving power from said power supply, said system control module comprising:
   a microprocessor;
   a system clock in electrical circuit relationship with said microprocessor;
   an address buss in electrical circuit relationship with said microprocessor;
   a data buss in electrical circuit relationship with said microprocessor;
   an address decoder in electrical circuit relationship with said address buss;
   an address buffer in electrical circuit relationship with said address buss;
   serial data interfaces in electrical circuit relationship with said data and address busses;
   a serial data clock in circuit relationship with said system clock and with said serial data interfaces;
   baud rate switches in electrical circuit relationship with said serial data clock and with predetermined ones of said serial data interfaces; and
   an interrupt timer in electrical circuit relationship with said microprocessor and with said serial data clock for enabling said microprocessor to make decisions based on elapsed real time.

16. A system as in claim 15 wherein said system control module further includes:
   a divider in electrical circuit relationship between said serial data clock and said interrupt timer;
   a data buffer in electrical circuit relationship between said microprocessor and said data buss and having an input/output port; and
   an automatic restart circuit in electrical circuit relationship with said input/output port and between said divider and said system clock.

17. A system as in claim 1 wherein said distributing means include an electrical power supply, a system control module in operative relationship for receiving power from said power supply, and a memory module in circuit relationship with said power supply and with said system control module, said memory module comprising:
   a random access memory in electrical circuit relationship with said system control module for storage of real time information;
   an optional memory-programmable read only memory in electrical circuit relationship with said system control module for selecting optional system configurations and parameters; and
   a main program memory-electrically programmable read only memory in electrical circuit relationship with said system control module for storage of a main computer program which directs said distribution and management system to perform its functions.

18. A system as in claim 3 wherein said distributing means include an electrical power supply, a system control module in operative relationship for receiving power from said power supply, a memory module in circuit relationship with said power supply and with said system control module, and an input/output module in circuit relationship with said answering means, said input/output module, comprising:
   an address decoder in electrical circuit relationship with said system control module for allowing data to be read from or data to be entered into said input/output module when addressed by said system control module;
   an addressable latch in electrical circuit relationship with said system control module and with said address decoder;
   a multiplexer in electrical circuit relationship with said system control module and with said address decoder;
   an "in" gate in electrical circuit relationship with said system control module and between said address decoder and said multiplexer; and
   an "out" gate in electrical circuit relationship with said system control module and between said address decoder and said addressable latch.

19. A system as in claim 18 wherein said distributing means includes line cards, said automatic answering means includes a pre-recorded announcer containing a pre-recorded message and wherein said input/output module further includes:
   a connector in electrical circuit relationship with said announcer;
   an audio amplifier in electrical circuit relationship with said connector and with said line cards for amplifying the audio from said announcer;
   an audio transformer in electrical circuit relationship with said audio amplifier and said line cards; and
   a signal detector in electrical circuit relationship between said audio amplifier and said multiplexer for detecting idle periods from the audio output of said announcer.

20. A system as in claim 1 wherein said distributing means include an electrical power supply, a system control module in operative relationship for receiving power from said power supply, a memory module in circuit relationship with said power supply and with said system control module, a ring detect module in circuit relationship with said system control module and with said key telephone system, and line cards in circuit relationship with said ring detect module.

21. A system as in claim 20 wherein said ring detect module comprises:
   isolator circuits in electrical circuit relationship with said line cards;
   a multiplexer having a plurality of electrical input leads, each said lead in electrical circuit relationship with a separate one of said isolator circuits;
   said multiplexer having additional input leads in circuit relationship with said system control module and an output lead in circuit relationship with said system control module for presenting the ring status of each of said incoming telephone lines to said system control module;
   a latch in electrical circuit relationship with said multiplexer and with said system control module; and
   a switch in electrical circuit relationship between said latch and said key telephone system for activating an audible or visual indication of an incoming call with said key telephone system.

22. A system as in claim 20 further including an off-hook detect/ring module in electrical circuit relationship with said system control module and with said key telephone system, said off-hook detect/ring module, comprising:
   an address decoder in electrical circuit relationship with said system control module;
   a position select switch in circuit relationship with said address decoder;
   an addressable latch in electrical circuit relationship with said position select switch and with said system control module;
   a ring switch in electrical circuit relationship with said latch and said key telephone system for enabling activation of an audible or visual indication at one of said agent positions;
   a test switch in electrical circuit relationship with said latch;
   a multiplexer in electrical circuit relationship with said test switch and with said system control module;
   isolator circuits in electrical circuit relationship with said key telephone system agent positions for reflecting the off hook status of said agent positions;
   an "in" gate in electrical circuit relationship with said system control module, said position select switch and with said multiplexer; and
   an "out" gate in electrical circuit relationship with said system control module, said position select switch and with said latch.

23. A system as in claim 20 further including an off-hook detect/ring module in electrical circuit relationship with said system control module and with said key telephone system; line card interface modules in electrical circuit relationship with said system control module; and each of said line card interface modules in circuit with a predetermined number of said line cards.

24. A system as in claim 23 wherein said line card interface module, comprises:
   an address decoder in electrical circuit relationship with said system control module;
   a position select switch in electrical circuit relationship with said address decoder.
   an addressable latch in electrical circuit relationship with said system control module and with said position select switch;
   a buffer in electrical circuit relationship with said addressable latch;
   connectors in electrical circuit relationship with said buffer and with said line cards;
   a test switch in electrical circuit relationship with said address decoder and said buffer;
   a multiplexer in electrical circuit relationship with said system control module and said test switch;
   a tri-state buffer in electrical circuit relationship with said connectors and with said test switch;
   an "in" gate in electrical circuit relationship with said system control module, said position select switch and with said multiplexer; and
   an "out" gate in electrical circuit relationship with said system control module, said position select switch and with said addressable latch.

25. A system as in claim 23 wherein each of said line cards comprises:
- first and second electrical conductors in circuit relationship with said key telephone system;
- a ring detection circuit connected in electrical circuit relationship with said first and second conductors;
- a ring time out circuit in electrical circuit relationship with said ring detection circuit;
- a first relay circuit in electrical circuit relationship with said ring time out circuit and with said ring detect module;
- a second relay circuit in electrical circuit relationship with said ring time out circuit and with said key telephone system;
- a lamp control circuit in electrical circuit relationship with said ring time out circuit and with said key telephone system;
- an inverter circuit connected in electrical circuit relationship with said key telephone system, said lamp control circuit, and with said first relay circuit;
- an off-hook detector circuit in electrical circuit relationship with first electrical conductor;
- a hold time out circuit connected in electrical circuit relationship with said off-hook detector circuit; and
- a hold circuit in electrical circuit relationship with said hold time out circuit, said ring time out circuit, said inverter circuit, and with said lamp control circuit.

26. A system as in claim 25 wherein each of said line cards further includes:
- an analog switch in electrical circuit relationship with said key telephone system, said first and second conductors, and with one of said line card interface modules, whereby an incoming telephone call is connected to a delay answer message or music when the incoming call is placed on "hold".

27. A system as in claim 26 wherein each of said line cards further includes:
- a first interface circuit in electrical circuit relationship with one of said line card interface modules, said hold circuit, said lamp control circuit, and with said inverter for causing lamp indications at said agent positions to be flashing on and off when so directed by said system control module.

28. A system as in claim 27 wherein each of said line cards further includes:
- a second interface circuit in electrical circuit relationship with one of said line card interface modules, and with said analog switch for connecting an incoming call to a delayed answer message or music on hold when so directed by said system control module.

29. A system as in claim 28 wherein each of said line cards further includes:
- a third interface circuit in electrical circuit relationship with one of said line card interface modules and with said lamp control circuit for causing lamp indications at said agent positions to be on continuously when so directed by said system control module.

30. A system as in claim 29 wherein each of said line cards further includes:
- a fourth interface circuit in electrical circuit relationship with one of said line card interface modules, said hold circuit, said first relay circuit, said lamp control circuit, and with said inverter for causing an incoming call to be automatically answered and placed on hold when so directed by said system control module and for monitoring the status of said inverter.

31. A system as in claim 30 wherein each of said line cards further includes:
- a fifth interface circuit in electrical circuit relationship with one of said line card interface modules, and with said hold circuit for monitoring the status of said hold circuit.

32. A system as in claim 23 wherein said electrical power supply, comprises:
- a power line filter in electrical circuit relationship with a source of AC power;
- a transformer in electrical circuit relationship with said power line filter;
- a bridge rectifier connected in electrical circuit relationship with a secondary winding of said transformer; and
- a capacitor filter circuit connected in electrical circuit relationship with said rectifier.

33. A system as in claim 32 further including a test lamp in circuit with said capacitor filter, and test points in circuit with said lamp and with said capacitor filter for enabling observation of the condition of said power supply.

* * * * *

UNITED STATES PATENT AND TRADEMARK OFFICE
CERTIFICATE OF CORRECTION

PATENT NO. : 4,408,100

DATED : October 4, 1983

INVENTOR(S) : George E. Pritz et al

It is certified that error appears in the above—identified patent and that said Letters Patent are hereby corrected as shown below:

Claim 8, column 13, line 54, delete "to" and substitute --for--.

Signed and Sealed this

Twenty-ninth Day of November 1983

[SEAL]

Attest:

GERALD J. MOSSINGHOFF

Attesting Officer

Commissioner of Patents and Trademarks